United States Patent [19]

Strobel

[11] 4,204,464
[45] May 27, 1980

[54] CONTINUOUS DESORPTION APPARATUS FOR AROMA FLAVOR CONCENTRATE

[75] Inventor: Rudolf G. K. Strobel, Cincinnati, Ohio

[73] Assignee: The Procter & Gamble Company, Cincinnati, Ohio

[21] Appl. No.: 18,975

[22] Filed: Mar. 9, 1979

Related U.S. Application Data

[62] Division of Ser. No. 846,000, Oct. 27, 1977, abandoned.

[51] Int. Cl.$^2$ ........................ A47J 31/30; A47J 31/42
[52] U.S. Cl. .................................... 99/286; 99/289 R; 99/293; 99/483; 426/594; 426/386
[58] Field of Search ...................... 99/286, 293, 289 R, 99/279, 300, 483, 484, 485, 496; 426/594, 595, 596, 597, 386

[56] References Cited

U.S. PATENT DOCUMENTS

| | | | |
|---|---|---|---|
| 2,517,073 | 8/1950 | Alvarez | 99/286 |
| 2,811,098 | 10/1957 | Pavlecka | 99/286 |
| 3,717,472 | 2/1973 | Strobel | 426/594 |
| 3,966,975 | 6/1976 | Hansen | 426/594 |
| 3,997,685 | 12/1976 | Strobel | 426/594 |

*Primary Examiner*—Robert W. Jenkins
*Attorney, Agent, or Firm*—Leonard Williamson; Jules P. Filcik; Rose Ann Dabek

[57] ABSTRACT

This invention relates to a process and apparatus for the production of an aroma flavor concentrate from aroma- and flavor-bearing substrates, especially roasted and ground coffee. More particularly, the invention is concerned with a process for continuously de-aromatizing and desorbing aroma and flavor constituents from said substrates by passing wet steam counter-currently through a continuous columnar bed of said substrate, said bed flowing upwardly through a substantially upright vacuum-tight desorption column. Wet steam is applied in an amount and manner to form and maintain a substantially stationary desorption zone in said flowing columnar bed at a finite distance above a bottom inlet of said upright desorption column. The stationary desorption zone is formed by the condensation of the wet steam as it passes into a progressively cooler temperature gradient in said flowing columnar bed. The temperature gradient is created by the continuous introduction of chilled fresh substrate through the bottom inlet. A vaporous aroma flavor fraction and a desorbed soluble solids fraction are collected in separate cold traps in communication with said column at about said stationary desorption zone.

5 Claims, 3 Drawing Figures

CONTINUOUS DESORPTION APPARATUS FOR AROMA FLAVOR CONCENTRATE

CROSS-REFERENCE TO RELATED APPLICATION

This application is a divisional of commonly assigned, copending application Ser. No. 846,000, filed Oct. 27, 1977, now abandoned.

BACKGROUND OF THE INVENTION

This invention relates to a continuous process and an apparatus for the separation of aroma and flavor from aroma and flavor-bearing substrates, especially roasted and ground coffee. Desorption technology is described in U.S. Pat. Nos. 3,717,472, Feb. 20, 1973, and 3,997,685, Dec. 14, 1976, both to the present inventor, Rudolf G. K. Strobel, the teachings of which are incorporated herein by reference in their entirety.

Many food products, especially extracts for beverages, are known to contain a delicate balance of both flavor- and aroma-bearing essences. It is very common for these types of foods to rapidly develop a rancid aroma after being subjected to atmospheric conditions for a short period of time. Moreover, the compounds contributing aroma rancidity often act as catalytic agents for the rapid development of rancidity in the beverage flavor components. Therefore, while certain of the highly volatile aroma-bearing essences are extremely desirable from the standpoint of presenting a pleasing initial sensory impact, they are undesirable in the long run from the standpoint of contributing to rapid development of aroma and flavor rancidity.

Certain of these well-known substrates such as coffee, tea, cocoa beans, nuts, and some well-known fruits such as oranges, grapes, strawberries, cherries, and the like are often processed by extraction methods to obtain concentrated extracts which can either be dried or diluted to prepare beverages. Typically, during processing to obtain extracts, the previously-referred-to delicate balance of aroma-bearing essences and flavor-bearing essences is upset by subjection to heat and pressure conditions necessary for an efficient extraction process. Thus, the ultimate beverage extract or dried material contains a quite different balance of flavor- and aroma-bearing essences than did the initial food product.

For many years, those skilled in the art have approached this problem by attempting to remove the aroma-bearing essences from the natural food product prior to extraction, and thereafter, add the aroma-bearing essences back after the extraction procedures. In other words, the aroma essences are removed, the remaining portion is subjected to the necessary temperature and pressure conditions suitable for high extraction yields, and subsequently, the aroma-bearing essences are added back. While such processes have met with a large degree of success, especially in regard to coffee and tea productions, they still have certain inherent disadvantages.

One disadvantage in the prior art is the lack of a satisfactory continuous desorption process for the production of aroma and flavor concentrates. The advantages of a continuous process over semi-continuous or batch processes will be apparent to those skilled in the art.

Thus, an object of the present invention is to provide a continuous process for desorption of an aroma and flavors from edible substrates, particularly coffee.

Another object of this invention is to provide an apparatus particularly designed to accommodate said continuous process.

Other objects of the present invention will be apparent in the light of the following disclosure.

SUMMARY OF THE INVENTION

An improved continuous process and apparatus for the separation of aromas and flavors from flavor and aroma-bearing substrates, especially roasted and ground coffee. The process comprises the following steps:

(a) forming a continuous bed of said substrate flowing upwardly into a substantially upright desorption column, fresh, chilled substrate being introduced into a bottom inlet port and being desorbed therein and discharged at a top outlet port;

(b) maintaining said desorption column under an absolute pressure of from about 0.1 mm to about 300 mm of mercury;

(c) applying wet steam downwardly from the top of said column through said flowing columnar bed in an amount and manner effective to de-aromatize and desorb flavors from said substrate, said wet steam being applied in an amount and manner to form and maintain a substantially stationary desorption zone in said flowing columnar bed at a finite distance above said bottom inlet port, said stationary desorption zone being formed by the application and condensation of the wet steam as it passes through a cooling temperature gradient and a pressure gradient in said flowing columnar bed, said temperature gradient being created by the continuous introduction of said chilled fresh substrate, and said pressure gradient being produced over the length of the columnar bed;

(d) collecting a vaporous aroma flavor fraction and a liquid, soluble-solids fraction in vacuum cold traps in communication with said column at about said desorption zone.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 2 also shows a separation chamber having upper and lower vacuum outlet pipes separated by a planar ring floor.

Figure 1:
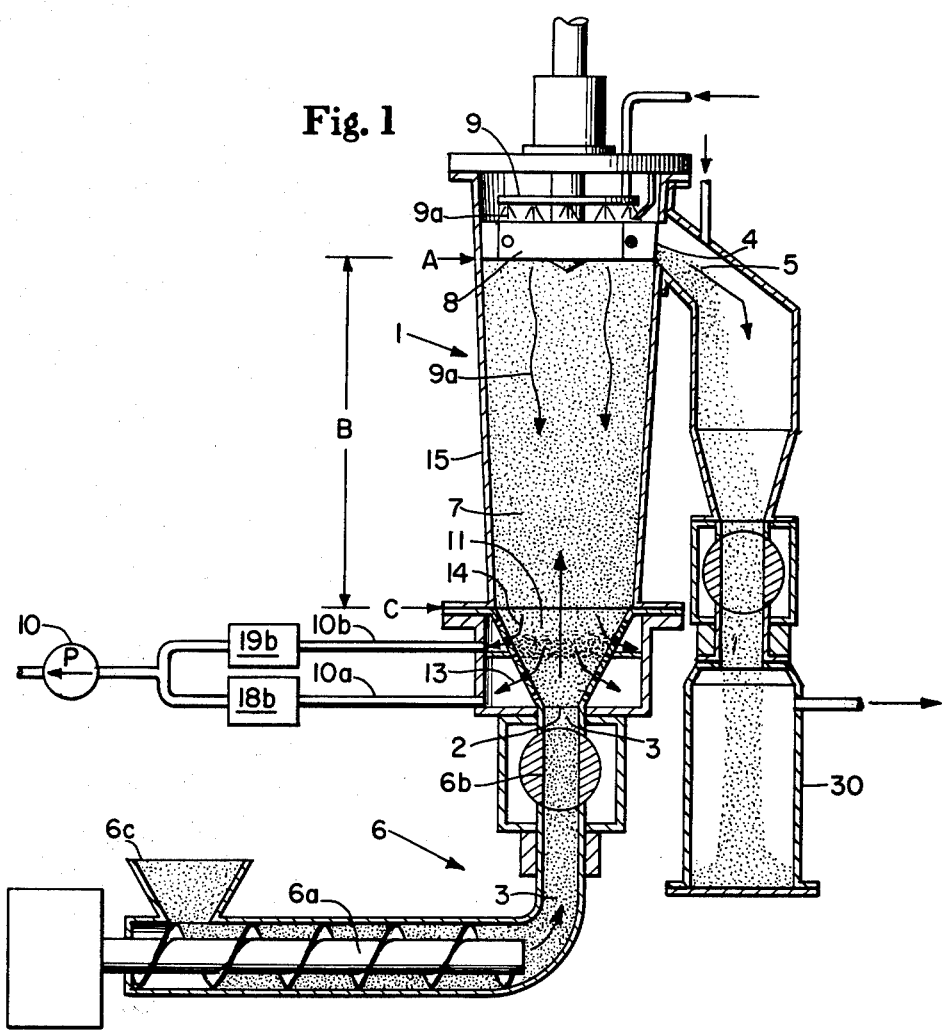
FIG. 1 shows a pictorial schematic drawing of a continuous desorption column in which the invention is illustrated.
Figure 3:
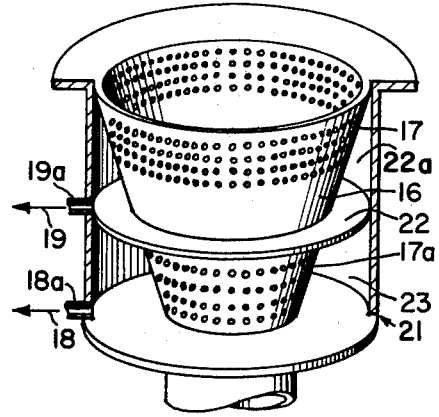
FIG. 3 shows a partial cut-away perspective view of a preferred separation chamber and conical sieve section of the desorption column of FIGS. 1 and 2.
Figure 2:
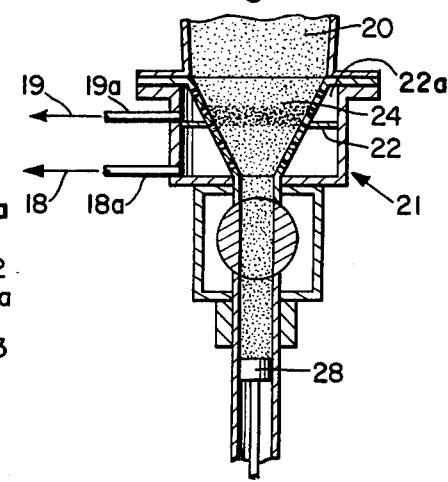
FIG. 2 shows a partial schematic of a piston feed system for a continuous desorption column.

While the invention will be described in connection with a preferred embodiment, as illustrated in FIGS. 1 and 2, it will be understood that it is not intended to thereby limit the invention to such embodiment. On the contrary, it is intended to cover all alternatives, modifications and equivalents as may be included within the spirit and scope of the invention as defined by the specification and the appended claims.

DESCRIPTION OF A PREFERRED EMBODIMENT

Referring now to FIG. 1 of the drawings which illustrates a desorption apparatus for separating flavor and aroma products from an aroma- and flavor-bearing substrate in which the process of this invention may be carried out. This form of apparatus comprises:

(a) an upright desorption column 1 having a bottom inlet port 2 for continuously receiving chilled fresh substrate 3 and a top outlet port 4 for discharging desorbed substrate 5;

(b) a feeding means 6 connected to said bottom inlet port 2 for force-feeding said fresh substrate 3 at a predetermined rate upwardly through said upright desorption column 1 via said ports 2 and 4 and thereby forming a continuously flowing columnar bed 7 of said substrate, and a means for discharging 8 said desorbed substrate 5 at a predetermined rate through said top outlet port 4;

(c) wet steam means 9 for applying a predetermined quantity of wet steam 9a from the top of said column 1, downwardly and counter-currently to and through said flowing columnar bed 7, making contact with the substrate and thereby de-aromatizing and desorbing flavors from the substrate;

(d) a vacuum means 10 with outlet pipes 10a and 10b for holding said desorption column 1 under vacuum, said vacuum means 10 being in communication with said column 1 above said bottom inlet port 2, said vacuum means 10 creating a traverse force in said upwardly flowing columnar bed 7 and thereby drawing down the wet steam 9a and further vaporizing said wet steam in said column, wherein a substantially stationary desorption zone 11 is formed in said flowing columnar bed 7 above said bottom inlet port 2 by:

(1) condensation of the wet steam 9a as it passes into a cooling temperature gradient created and maintained by said fresh chilled substrate 3; and (2) compaction of the columnar bed 7 by said traverse force and said feeding means;

(e) cold trap means 18b and 19b in communication with said desorption zone 11 and said vacuum means 10 for separating and collecting:

(1) a vaporous aroma flavor bearing fraction 13, through lower vacuum outlet pipe 10a, and (2) a liquid soluble-solids fraction 14 through the upper vacuum outlet pipe 10b.

The apparatus of FIG. 1 is a column having cylindrically disposed walls 15. The feeding means 6 has a screw conveyor-grinder with feed hopper 6c. The conveyor grinds the substrate as it conveys it. Ball valve 6b is also shown. Feed rate can be adjusted by rate of rotation of screw 6a or ball valve 6b.

A preferred feeding means comprises an oil expeller auger grinder adapted for conveying and grinding cold coffee beans. In such a system all aroma is captured. Another preferred feeding means comprises an auger grinder system arranged substantially vertically and in line with the desorption column instead of horizontally as shown in FIG. 1. An alternative feed system is shown in FIG. 2 in piston 28; in such a system, roast and ground coffee is used.

FIG. 3 shows:

(1) a rigid conical tube 16 having two conical sieve sections 17 and 17a wherein the substantially stationary desorption zone is maintained, and through which a vaporous aroma-flavor fraction 18 and a liquid soluble solids fraction 19 are separated from the continuous columnar bed, also shown is (2) a separation chamber 21 enclosing said rigid conical tube 17, said chamber having an upper outlet pipe 19a and a lower vacuum outlet pipe 18a for transporting an aroma-flavor fraction 18 and a soluble solids fraction 19 respectively to cold traps 18b and 19b (shown in FIG. 1).

The separation chamber 21 has within it a planar ring floor 22 encircling said rigid conical tube 16. Floor 22 divides the chamber into two parts 22a and 23. The upper outlet pipe 19a in the upper part 22a and the lower outlet pipe 18a in the lower part 23. A liquid soluble solids fraction 19 is caught on said floor 22 in the upper part of the chamber 21 and is transported to a cold trap through said upper outlet pipe 19a. A vaporous aroma-flavor fraction enters the lower chamber part 23 of separation chamber 21 and is from there transported to another cold trap through outlet pipe 18a.

With reference to FIG. 1, wet steam 9a is sprayed on the top of the columnar bed 7 in the form of hot water. The desorption column 1 is held under an absolute pressure of from about 0.1 mm to about 300 mm of mercury by a vacuum (pump) means 10. The temperature of the hot water leaving wet steam means 9 is preferably boiling hot. The vacuum conditions of the desorption column 1 convert the hot water to wet steam 9a which temperature is reduced upon contact with the substrate columnar bed 7 as it travels through a cooling temperature gradient created by the continuous introduction of chilled fresh substrate 3. The temperaure of the chilled fresh substrate 3 can be from about $-200°$ C. to about $10°$ C.; in short, it should be cold enough to (1) condense the wet steam 9a to water at the substantially stationary desorption zone 11 within the columnar bed 7, and (2) maintain the temperature within said flowing columnar bed at about $10°$ C. to about $70°$ C.

The vaporous flavor-aroma fraction shown in FIG. 2 is transported to a cold trap via a lower outlet pipe 18a positioned below the upper outlet pipe 19a and below the middle of stationary desorption zone 24. The temperature of the cold trap 19a is preferably $-200°$ C. to about $-70°$ C. The frost collected is melted by contact with an aqueous extract containing substrate soluble solids. The resulting mixture is preferably freeze-dried. The liquid fraction is preferably collected at a temperature of from $-70°$ C. to $0°$ C. Preferably, the wet steam is applied to the columnar bed in a pulsating manner to prevent channeling.

The discharge means 8 shown in FIG. 1 are vacuum lock wipers which wipe the upper layer of the columnar bed into holding tank 30. The desorbed substrate 5 can be further extracted.

The apparatus used in the example was made of stainless steel. The rigid conical tube therein had diameters of about 5 and 2 units (inches), respectively, at the top and bottom. Referring not to FIG. 1, the diameter of column at elevation A is about 6.75 units, and the diameter at elevation C is about 5 units. The diameter of inlet port 2 is 2 units. The length of the column along line B is about 14 units and the length of the rigid conical tube is about 10 units.

Variations and modifications of the desorption column will be apparent to those skilled in the art.

EXAMPLE

About 10 kg. of a blend of roasted coffee beans were cooled with liquid nitrogen and fed in small portions into a screw conveyor-grinder of a desorption column apparatus like the one shown in FIG. 1. An expeller oil auger was adapted to grind and convey, and consisted of a solid stainless steel (polygonal) barrel. The barrel also was equipped with scraper to facilitate the grinding; also, the auger used was the same as a conventional oil expeller auger, i.e. constructed with interrupted flights. About 5% dry ice, by weight, of the beans was co-fed into the screw conveyor-grinder.

The coffee beans were crushed to a particle size of from 50 to about 2500 microns and force-fed by the auger-grinder up into the desorption column. A vacuum of about 1 mm of mercury absolute was applied to the column through both desorption outlet pipes. When about one-third of the column was filled with coffee (after about 20 minutes) spurts of boiling water were applied through nozzle system located just below the top of the column. Spurts of water were applied intermittently while coffee was fed into the column continuously which formed into a continuous columnar bed. The spurts of water (wet steam) wet the coffee particles. The wetting was visible through an inspection window by a dark/wet appearance of the coffee particles in the flowing columnar bed. Application of water spurts was continued until the wet desorption zone front was driven down to the conical sieve section of the column. The desorption front, herein called a desorption zone, was held in this conical sieve section by synchronizing the application of water spurts with the rate of feed of chilled fresh coffee beans. The rate of feed of chilled fresh coffee beans was adjusted by changing the speed of rotation of the auger-grinder screw conveyor. The desorbed coffee was discharged by a wiping device located at the top of the column into a vacuum-lock chamber.

For every kg. of dry coffee beans, about 60 g. of vaporous aroma-flavor fraction was drawn out the lower outlet pipe in the desorption chamber, and about 2 liters of liquid soluble coffee solids fraction was drawn out of the upper outlet pipe in the upper section of the desorption chamber. Both fractions were worked up in the conventional manner as taught in U.S. Pat. No. 3,997,685, dated Dec. 14, 1976 at Columns 14 and 15, to produce an aroma-flavor concentrate and a coffee base.

An instant coffee product made with the aroma-flavor concentrate was of a high fidelity aroma-flavor character significantly preferred over ordinary instant coffees as judged by a panel of expert coffee tasters.

What is claimed is:

1. In a desorption apparatus for separating flavor and aroma products from an aroma- and flavor-bearing substrate, wherein the improvement comprises:
    (a) an upright desorption column having a bottom inlet port for continuously receiving chilled fresh substrate and a top outlet port for discharging desorbed substrate;
    (b) a feeding means connected to said bottom inlet port for force-feeding said fresh substrate at a predetermined rate upwardly through said upright desorption column via said ports and thereby forming a continuously flowing columnar bed of said substrate, and a means for discharging said desorbed substrate at a predetermined rate through said top outlet port;
    (c) wet steam means for applying a predetermined quanitity of wet steam, from the top of said column, downwardly and counter-currently to and through said flowing bed, making contact with said substrate and thereby de-aromatizing and desorbing flavors from said substrate;
    (d) a vacuum means for holding said desorption column under vacuum, said vacuum means being in communication with said column above said bottom inlet port, said vacuum means creating a traverse force in said upwardly flowing columnar bed an thereby drawing down the wet steam and further vaporizing said wet steam in said column, wherein a substantially stationary desorption zone is formed in said flowing columnar bed above said bottom inlet port by:
        (1) precipitation of the wet steam as it passes into a cooling temperature gradient created and maintained by said fresh chilled substrate; and
        (2) compaction of the substrate bed by said traverse force and said feeding means;
    (e) cold trap means, in communication with said desorption zone and said vacuum means for separating and collecting:
        (1) a vaporous aroma flavor bearing fraction, and
        (2) a liquid soluble-solids fraction.

2. The apparatus of claim 1 wherein said column comprises a vessel having cylindrically disposed walls.

3. The apparatus of claim 1 wherein said feeding means is a conveyor-grinder screw conveyor.

4. The apparatus of claim 1 wherein said column comprises:
    (1) a rigid conical tube having a conical sieve section wherein said substantially stationary desorption zone is maintained, and through which said aroma-flavor fraction and said liquid soluble solids fraction are separated from said continuous columnar bed, and
    (2) a separation chamber enclosing said conical sieve section, said chamber having upper and lower vacuum outlet pipes for transporting said aroma-flavor fraction and said soluble solids fraction to said cold traps.

5. The apparatus of claim 4 wherein said separation chamber has within it a planar ring floor encircling said tube and separating the upper outlet pipe from the lower outlet pipe, and wherein said liquid soluble solids fraction is collected on said floor and transported to a cold trap through said upper outlet pipe.

* * * * *